United States Patent
Morita et al.

(10) Patent No.: US 12,436,544 B2
(45) Date of Patent: Oct. 7, 2025

(54) WORK ASSISTANCE SYSTEM AND WORK ASSISTANCE COMPOSITE SYSTEM

(71) Applicant: KOBELCO CONSTRUCTION MACHINERY CO., LTD., Hiroshima (JP)

(72) Inventors: Yuki Morita, Hiroshima (JP); Yusuke Fujiwara, Hiroshima (JP); Kazuhiro Ueda, Hiroshima (JP); Yoichiro Yamazaki, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 161 days.

(21) Appl. No.: 18/272,932

(22) PCT Filed: Dec. 13, 2021

(86) PCT No.: PCT/JP2021/045801
§ 371 (c)(1),
(2) Date: Jul. 18, 2023

(87) PCT Pub. No.: WO2022/168443
PCT Pub. Date: Aug. 11, 2022

(65) Prior Publication Data
US 2024/0248492 A1 Jul. 25, 2024

(30) Foreign Application Priority Data

Feb. 2, 2021 (JP) .................................. 2021-014768

(51) Int. Cl.
*G05D 1/689* (2024.01)
*B64U 10/14* (2023.01)
(Continued)

(52) U.S. Cl.
CPC .............. *G05D 1/689* (2024.01); *E02F 9/24* (2013.01); *E02F 9/26* (2013.01); *B64U 10/14* (2023.01);
(Continued)

(58) Field of Classification Search
CPC .............. G05D 1/689; G05D 2101/20; G05D 2105/05; G05D 2109/20; G05D 2105/70;
(Continued)

(56) References Cited

U.S. PATENT DOCUMENTS

2018/0075759 A1* 3/2018 Kim ..................... G08G 5/55

FOREIGN PATENT DOCUMENTS

JP 2018-084955 A 5/2018
JP 2020-052889 A 4/2020
(Continued)

OTHER PUBLICATIONS

Machine translation of Kurosawa (WO 2020/196874, corresponds to Japanese Patent Application JP 2020014204) (Year: 2020).*

*Primary Examiner* — Alan D Hutchinson
(74) *Attorney, Agent, or Firm* — Carrier, Shende & Associates P.C.; Fulchand P. Shende; Joseph P. Carrier

(57) ABSTRACT

A system is provided which can achieve reliability of a notification about a moving manner of a work machine for a worker regardless of the distance between the work machine and the worker. A sign image M is projected onto a peripheral region of the worker (for example, a ground surface which is present in the vicinity of the worker to the extent that the worker is capable of visually recognizing the sign image M) by an unmanned aircraft 60. The sign image M is an image which represents a moving manner of a work machine 40. Thus, regardless of the distance between the work machine 40 and the worker, reliability of a notification about the moving manner of the work machine 40 for the (Continued)

worker is achieved compared to a case where the sign image M is projected onto an irrelevant place to the position of the worker.

9 Claims, 12 Drawing Sheets

(51) Int. Cl.
    *B64U 101/20*     (2023.01)
    *E02F 9/24*     (2006.01)
    *E02F 9/26*     (2006.01)
    *G05D 101/20*     (2024.01)
    *G05D 105/05*     (2024.01)
    *G05D 109/20*     (2024.01)

(52) U.S. Cl.
    CPC ..... *B64U 2101/20* (2023.01); *G05D 2101/20* (2024.01); *G05D 2105/05* (2024.01); *G05D 2109/20* (2024.01)

(58) Field of Classification Search
    CPC . G05D 2107/90; G05D 2109/254; E02F 9/24; E02F 9/26; E02F 9/261; E02F 9/205; B64U 10/14; B64U 2101/20; B64U 2101/31; B64U 2201/20; B64U 10/13; B64U 30/21; B64U 50/13; B64U 50/19; B64U 70/93
    See application file for complete search history.

(56) References Cited

FOREIGN PATENT DOCUMENTS

| | | |
|---|---|---|
| JP | 6707600 B2 | 6/2020 |
| JP | 2020-193503 A | 12/2020 |

\* cited by examiner

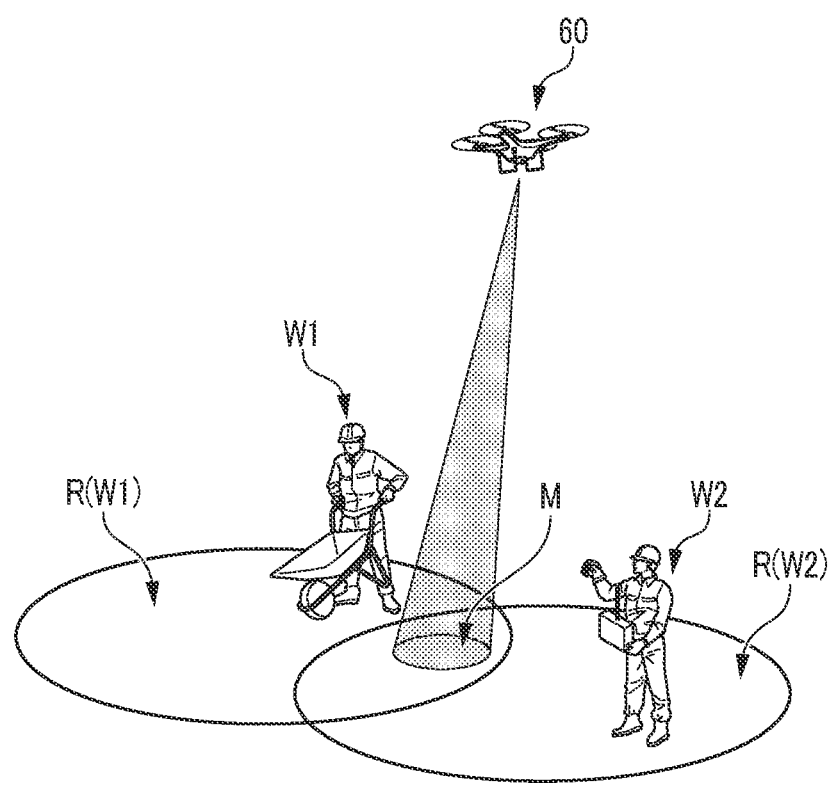

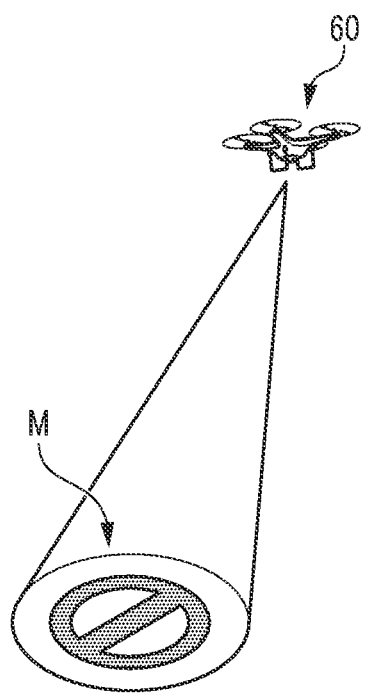

WORK ASSISTANCE SYSTEM AND WORK ASSISTANCE COMPOSITE SYSTEM

TECHNICAL FIELD

The present invention relates to a technique for notifying a worker of a state of a work machine.

BACKGROUND ART

In a case where a work machine is moved by a remote operation or an actual machine operation by an operator, in order to secure safety of workers present at a work site, an advancing direction of the work machine has to be reported to the workers. Accordingly, it is possible to use a technique in which when a carrier vehicle acts in accordance with an unmanned operation mode, an image of a guide route for the carrier vehicle is projected onto a road surface by an unmanned aerial vehicle (for example, see Patent Literature 1).

CITATION LIST

Patent Literature

Patent Literature 1: Japanese Patent No. 6707600

SUMMARY OF INVENTION

Technical Problem

However, in a case where a worker is spaced away from a guide route of a work machine, it becomes difficult to report, to the worker, a fact that the guide route is projected onto a road surface and further to report an advancing direction of the work machine.

Accordingly, an object of the present invention is to provide a system which can achieve reliability of a notification about a moving manner of a work machine for a worker regardless of the distance between the work machine and the worker.

Solution to Problem

A work assistance system of the present invention includes:
a first assistance process element which recognizes respective positions of a worker and a work machine in a time series manner; and
a second assistance process element which moves an unmanned aircraft to a position facing the position of the worker in a downward direction, the position of the worker being recognized by the first assistance process element, by controlling a flight action function of the unmanned aircraft, and which projects a sign image representing a moving manner of the work machine onto a peripheral region of the worker, the moving manner being defined based on a time series of the position of the work machine, the position of the work machine being recognized by the first assistance process element, by controlling a sign projection function of the unmanned aircraft.

In the work assistance system in the above configuration, the sign image is projected onto the peripheral region of the worker (for example, a ground surface which is present in the vicinity of the worker to the extent that the worker is capable of visually recognizing the sign image) by the unmanned aircraft. A "sign image" is an image which represents the moving manner of the work machine. Thus, regardless of the distance between the work machine and the worker, reliability of a notification about the moving manner of the work machine for the worker is achieved compared to a case where the sign image is projected onto an irrelevant place to the position of the worker.

BRIEF DESCRIPTION OF DRAWINGS

FIG. 9C is an explanatory diagram about a third notification manner of the actual machine state for the workers by the unmanned aircraft.

FIG. 12 is an explanatory diagram about a sixth notification manner of the actual machine state for the worker by the unmanned aircraft.

DESCRIPTION OF EMBODIMENTS (Configuration of Remote Operation System)

Figure 1:
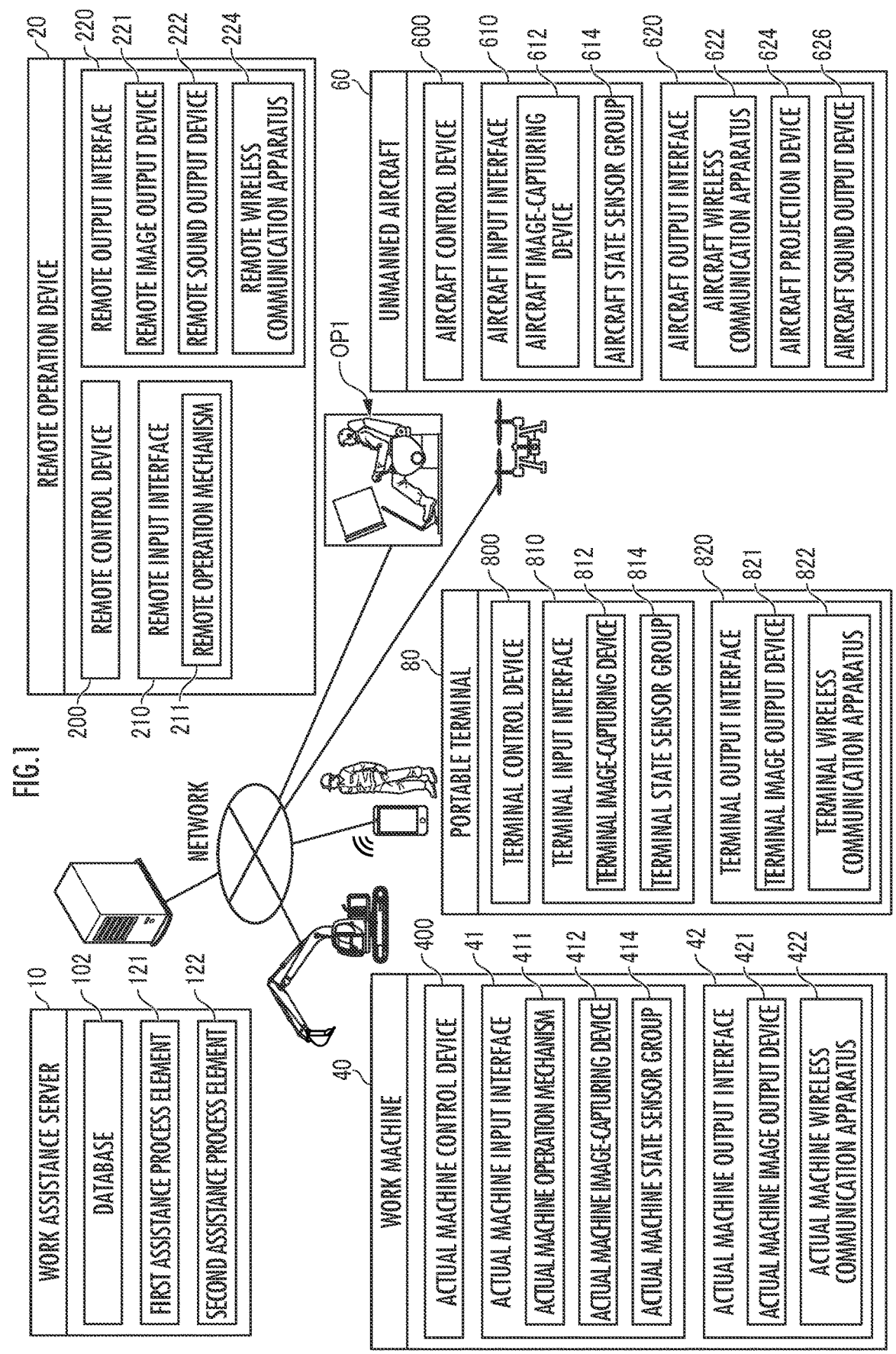
FIG. 1 is a configuration explanation diagram of a work assistance composite system as one embodiment of the present invention.

A work assistance system as one embodiment of the present invention, which is illustrated in FIG. 1, is configured with a work assistance server 10 for assisting a remote operation of a work machine 40 by a remote operation device 20. The work assistance server 10, the remote operation device 20, the work machine 40, an unmanned aircraft 60, and a portable terminal device 80 are configured to be capable of communicating with each other via a shared network or separate networks.

"Recognizing" of designated information by configuration elements (hardware) of the present invention represents a concept encompassing all computation processes for preparing designated information in usable forms in following computation processes, such as receiving the designated information, reading or searching for the designated information from an internal storage device (for example, a memory) and/or an external storage device (for example, an external database server), and calculating, estimating, predicting, and identifying the designated information by executing a computation process by targeting information, which is subjected to reception, reading, search, and so forth.

(Configuration of Work Assistance Server)

The work assistance server 10 includes a database 102, a first assistance process element 121, and a second assistance process element 122. The database 102 stores and retains captured image data and so forth. The database 102 may be configured with a database server separate from the work assistance server 10. Each of the assistance process elements is configured with an arithmetic processing device (a single-core processor or a multi-core processor or a processor core configuring that), reads necessary data and software from a storage device such as a memory, and executes a computation process based on the software for the data as a target, the computation process being described later.

(Configuration of Remote Operation Device)

The remote operation device 20 includes a remote control device 200, a remote input interface 210, and a remote output interface 220. The remote control device 200 is configured with an arithmetic processing device (a single-core processor or a multi-core processor or a processor core configuring that), reads necessary data and software from a storage device such as a memory, and executes a computation process based on the software for the data as a target.

The remote input interface 210 includes a remote operation mechanism 211. The remote output interface 220 includes a remote image output device 221, a remote sound output device 222, and a remote wireless communication apparatus 224.

The remote operation mechanism 211 includes a traveling operation device, a revolution operation device, a boom operation device, an arm operation device, and a bucket operation device. Each of the operation devices has an operation lever which accepts a rotation operation. An operation lever (traveling lever) of the traveling operation device is operated to move a lower traveling body 410 of the work machine 40. The traveling lever may also have a traveling pedal. For example, a traveling pedal may be provided which is fixed to a base portion or a lower end portion of the traveling lever. An operation lever (revolution lever) of the revolution operation device is operated to move a hydraulic revolution motor which configures a revolution mechanism 430 of the work machine 40. An operation lever (boom lever) of the boom operation device is operated to move a boom cylinder 442 of the work machine 40. An operation lever (arm lever) of the arm operation device is operated to move an arm cylinder 444 of the work machine 40. An operation lever (bucket lever) of the bucket operation device is operated to move a bucket cylinder 446 of the work machine 40.

Figure 2:
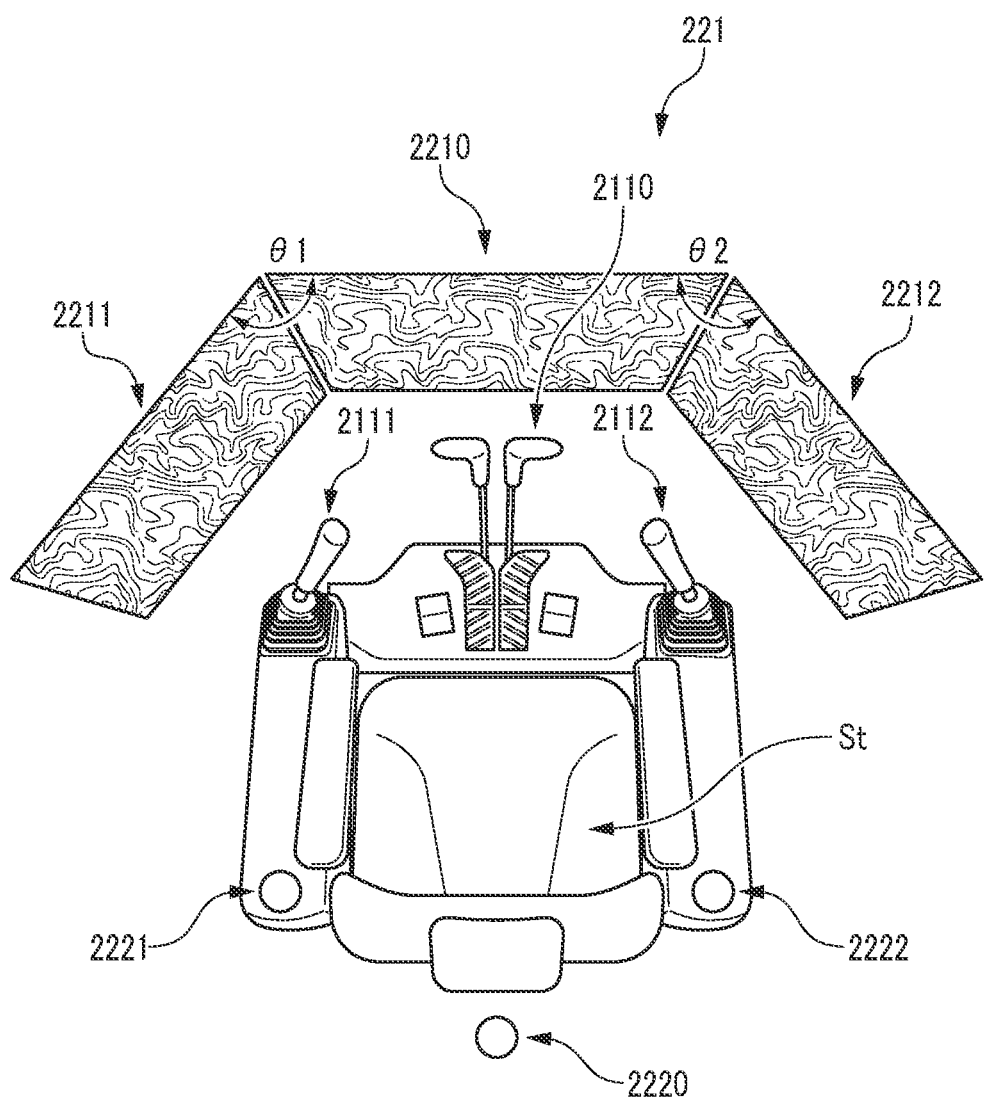
FIG. 2 is an explanatory diagram about a configuration of a remote operation device.

As illustrated in FIG. 2, the operation levers configuring the remote operation mechanism 211 are arranged around a seat St on which an operator is seated, for example. The seat St is in a form of a high-back chair with armrests but may be a seated portion in an arbitrary form on which the operator can be seated such as a form of a low-back chair without a headrest or a form of a chair without a backrest.

A pair of left and right traveling levers 2110 corresponding to left and right crawler tracks are arranged laterally side by side in a left-right direction in front of the seat St. One operation lever may be used as plural operation levers. For example, a left operation lever 2111 provided in front of a left frame of the seat St, which is illustrated in FIG. 2, may function as the arm lever in a case where the left operation lever 2111 is operated in a front-rear direction and may function as the revolution lever in a case where the left operation lever 2111 is operated in the left-right direction. Similarly, a right operation lever 2112 provided in front of a right frame of the seat St, which is illustrated in FIG. 2, may function as the boom lever in a case where the right operation lever 2112 is operated in the front-rear direction and may function as the bucket lever in a case where the right operation lever 2112 is operated in the left-right direction. Lever patterns may arbitrarily be changed by an operation instruction from the operator.

As illustrated in FIG. 2, the remote image output device 221 is configured with a central remote image output device 2210, a left remote image output device 2211, and a right remote image output device 2212 which are respectively arranged in front, in obliquely left front, and in obliquely right front of the seat St and have generally rectangular screens, for example. The respective shapes and sizes of the screens (image display regions) of the central remote image output device 2210, the left remote image output device 2211, and the right remote image output device 2212 may be the same or different.

As illustrated in FIG. 2, a right edge of the left remote image output device 2211 is adjacent to a left edge of the central remote image output device 2210 such that an inclination angle θ1 (for example, $120° \leq θ1 \leq 150°$) is formed by the screen of the central remote image output device 2210 and the screen of the left remote image output device 2211. As illustrated in FIG. 2, a left edge of the right remote image output device 2212 is adjacent to a right edge of the central remote image output device 2210 such that an inclination angle θ2 (for example, $120° \leq θ2 \leq 150°$) is formed by the screen of the central remote image output device 2210 and the screen of the right remote image output device 2212. The inclination angles θ1 and θ2 may be the same or different.

The respective screens of the central remote image output device 2210, the left remote image output device 2211, and the right remote image output device 2212 may be parallel with a perpendicular direction or may be inclined with respect to the perpendicular direction. At least one image output device among the central remote image output device 2210, the left remote image output device 2211, and the right remote image output device 2212 may be configured with an image output device which is divided into plural portions. For example, the central remote image output device 2210 may be configured with a pair of image output devices which have generally rectangular screens and are adjacent to each other in an up-down direction.

The remote sound output device 222 is configured with one or plural speakers and is, as illustrated in FIG. 2, configured with a central remote sound output device 2220, a left remote sound output device 2221, and a right remote sound output device 2222 which are respectively arranged in the rear of the seat St, in a rear portion of the left armrest, and in a rear portion of the right armrest, for example. Respective specifications of the central remote sound output device 2220, the left remote sound output device 2221, and the right remote sound output device 2222 may be the same or different.

(Configuration of Work Machine)

As illustrated in FIG. 1, the work machine 40 includes an actual machine control device 400, an actual machine input interface 41, and an actual machine output interface 42. The actual machine control device 400 is configured with an arithmetic processing device (a single-core processor or a multi-core processor or a processor core configuring that), reads necessary data and software from a storage device such as a memory, and executes a computation process based on the software for the data as a target.

Figure 3:
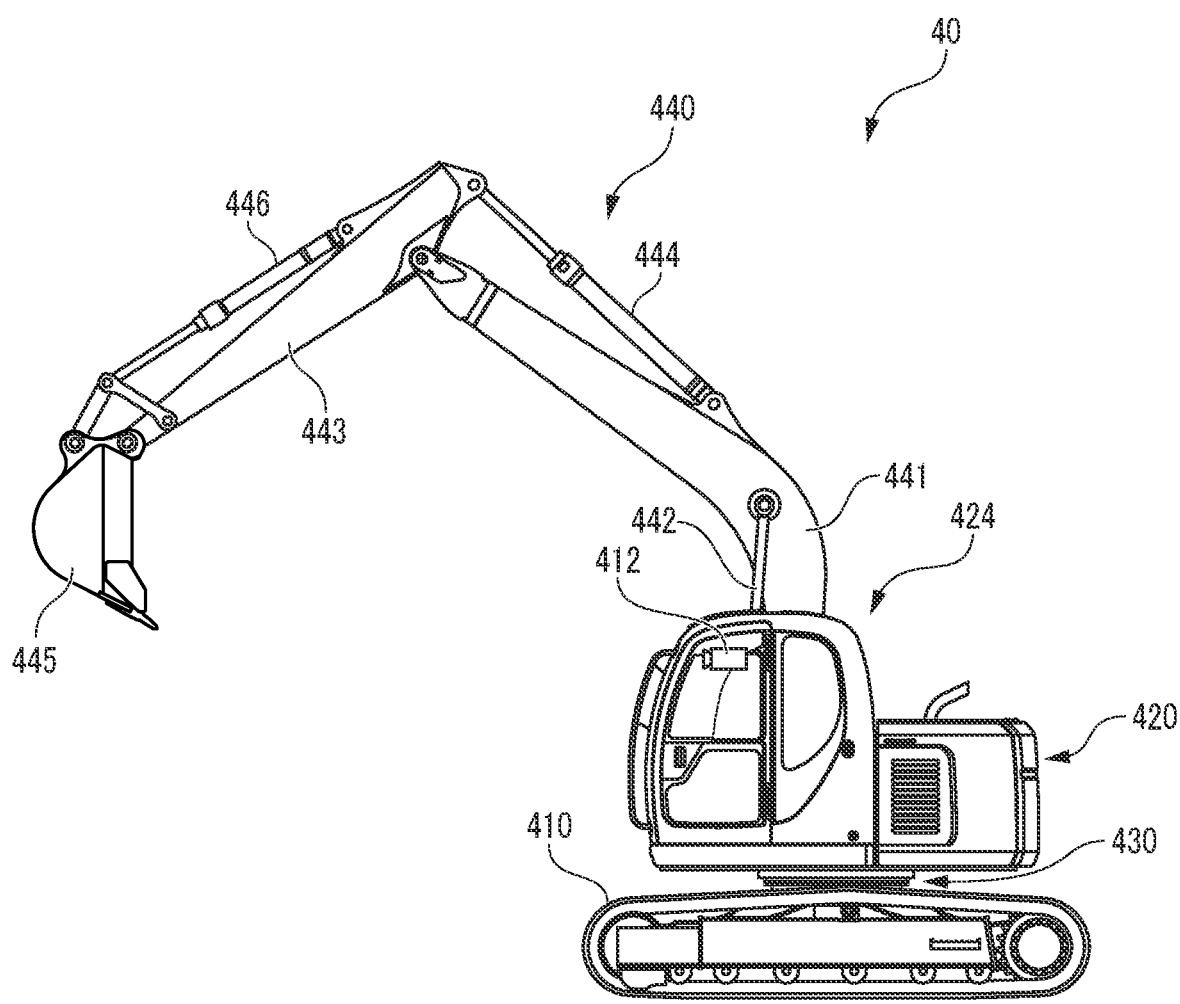
FIG. 3 is an explanatory diagram about a configuration of a work machine.

The work machine 40 is a hydraulic, electric, or hybrid drive crawler excavator (construction machine), the hybrid drive representing a combination of hydraulic and electric drives, for example, and includes, as illustrated in FIG. 3, a crawler lower traveling body 410 and an upper revolving body 420 which is revolvably mounted on the lower traveling body 410 via a revolution mechanism 430. A cab 424 (operator cab) is provided to a front left side portion of the upper revolving body 420. A work mechanism 440 is provided to a front central portion of the upper revolving body 420.

The actual machine input interface 41 includes an actual machine operation mechanism 411, an actual machine image-capturing device 412, and an actual machine state sensor group 414. The actual machine operation mechanism 411 includes plural operation levers, which are arranged similarly to those of the remote operation mechanism 211, around a seat arranged in an internal portion of the cab 424. A drive mechanism or a robot, which receives a signal corresponding to an operation manner of remote operation levers and moves actual machine operation levers based on the received signal, is provided to the cab 424. The actual machine image-capturing device 412 is installed in the internal portion of the cab 424, for example, and captures an image of an environment including at least a part of the work mechanism 440 through a front window and a pair of left and right side windows. A part or all of the front window (or a window frame) and the side windows may be omitted. The actual machine state sensor group 414 is configured with angle sensors for respectively measuring a rotation angle (derricking angle) of a boom 441 with respect to the upper revolving body 420, a rotation angle of an arm 443 with respect to the boom 441, and a rotation angle of a bucket 445 with respect to the arm 443, a revolution angle sensor for measuring a revolution angle of the upper revolving body 420 with respect to the lower traveling body 410, an external force sensor for measuring an external force exerted on the bucket 445, a three-axis acceleration sensor for measuring three-axis acceleration exerted on the upper revolving body 420, and so forth.

The actual machine output interface 42 includes an actual machine image output device 421 and an actual machine wireless communication apparatus 422. The actual machine image output device 421 is arranged in the internal portion of the cab 424 and in the vicinity of the front window, for example (see FIG. 6 and FIG. 9A to FIG. 9C). The actual machine image output device 421 may be omitted.

The work mechanism 440 as an actuation mechanism includes the boom 441 which is attached to the upper revolving body 420 to be capable of derricking, the arm 443 which is rotatably coupled with a distal end of the boom 441, and the bucket 445 which is rotatably coupled with a distal end of the arm 443. To the work mechanism 440, a boom cylinder 442, an arm cylinder 444, and a bucket cylinder 446 which are configured with hydraulic cylinders capable of extending and contracting are attached. As work units, in addition to the bucket 445, various attachments such as a nibbler, a cutter, and a magnet may be used.

The boom cylinder 442 is interposed between the boom 441 and the upper revolving body 420 such that the boom cylinder 442 extends and contracts by being supplied with hydraulic oil so as to rotate the boom 441 in a derricking direction. The arm cylinder 444 is interposed between the arm 443 and the boom 441 such that the arm cylinder 444 extends and contracts by being supplied with hydraulic oil so as to rotate the arm 443 around a horizontal axis with respect to the boom 441. The bucket cylinder 446 is interposed between the bucket 445 and the arm 443 such that the bucket cylinder 446 extends and contracts by being supplied with hydraulic oil so as to rotate the bucket 445 around a horizontal axis with respect to the arm 443.

(Configuration of Unmanned Aircraft)

The unmanned aircraft 60 is a rotorcraft and includes plural blades, an electric motor (actuator) for rotating the plural blades, a battery for supplying power to the motor or the like, and so forth. The unmanned aircraft 60 may remotely be operated by an aircraft remote operation device which is configured with the remote input interface 210 and/or the actual machine input interface 41. The unmanned aircraft 60 may be a configuration element of the work machine 40. In this case, the work machine 40 may include a basement where the unmanned aircraft 60 takes off and lands.

The unmanned aircraft 60 includes an aircraft control device 600, an aircraft input interface 610, and an aircraft output interface 620. The aircraft control device 600 is configured with an arithmetic processing device (a single-core processor or a multi-core processor or a processor core configuring that), reads necessary data and software from a storage device such as a memory, and executes a computation process based on the software for the data as a target.

The aircraft input interface 610 includes an aircraft image-capturing device 612 and an aircraft state sensor group 614. The aircraft image-capturing device 612 is configured to be capable of directing its optical axis on all bearings by an actuator. The aircraft state sensor group 614 is configured with a positioning sensor, a speed sensor and/or an acceleration sensor, a gyro sensor, and so forth for measuring a position, a speed and/or a posture, and so forth of the unmanned aircraft 60 in the up-down direction and a horizontal direction. A positioning device such as a GPS which is mounted on the unmanned aircraft 60 measures a latitude (Y coordinate value) and a longitude (X coordinate value) in a world coordinate system (or real space coordinate system). A TOF sensor or an air-pressure sensor measures an absolute altitude or a pressure altitude (Z coordinate value) in the world coordinate system.

The aircraft output interface 620 includes an aircraft wireless communication apparatus 622, an aircraft projection device 624, and an aircraft sound output device 626. The aircraft projection device 624 is configured to have a light emitting element such as an LED and/or a laser, a driver which controls a light emitting action of the light emitting element, and an optical system drive mechanism for directing light from the light emitting element to a designated direction and to project a sign image onto a predetermined range below the unmanned aircraft 60. The aircraft sound output device 626 is configured to output a sound (for example, a directional sound) toward a predetermined range below the unmanned aircraft 60.

(Configuration of Portable Terminal Device)

The portable terminal device 80 is configured with a terminal device, such as a smartphone, for example, which is designed to have size and weight proper for being carried by a working person. The portable terminal device 80 includes a terminal control device 800, a terminal input interface 810, and a terminal output interface 820. The terminal control device 800 is configured with an arithmetic processing device (a single-core processor or a multi-core processor or a processor core configuring that), reads necessary data and software from a storage device such as a memory, and executes a computation process based on the software for the data as a target.

The terminal input interface 810 includes a terminal image-capturing device 812 and a terminal state sensor group 814. The terminal state sensor group 814 is configured with a positioning sensor, a speed sensor and/or an acceleration sensor, a gyro sensor, and so forth for measuring a position, a speed and/or a posture, and so forth of the portable terminal device 80 in the up-down direction and the horizontal direction. The terminal output interface 820 includes a terminal image output device 821 and a terminal wireless communication apparatus 822.

(First Function)

Figure 4:
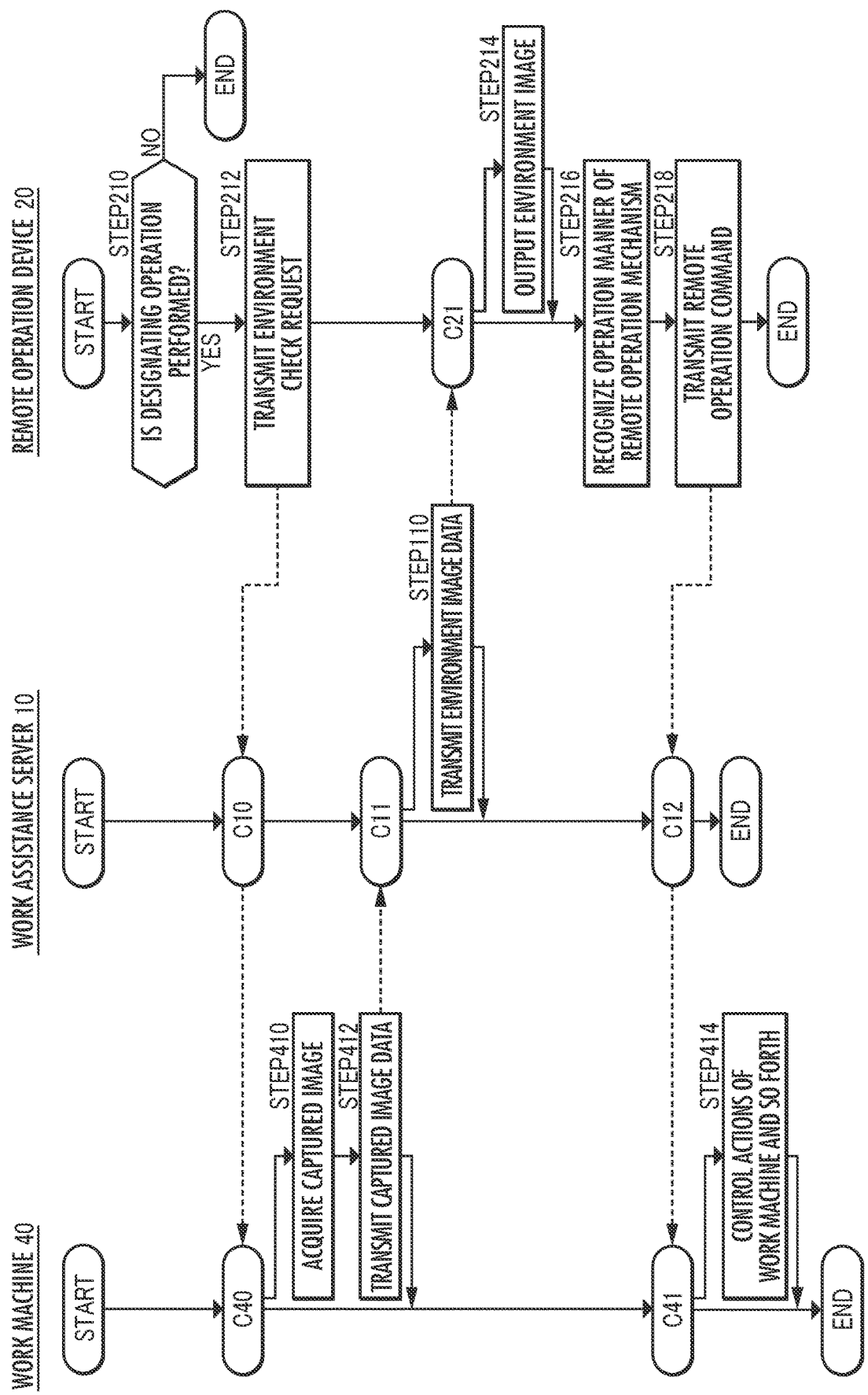
FIG. 4 is an explanatory diagram about a first function of a work assistance system.

FIG. 4 is a flowchart for explaining a first function as a basic function of the work assistance system, the first function being exhibited by cooperation among the work assistance server 10, the remote operation device 20, and the work machine 40 in the above configurations. In the flowchart, a block indicated by "CXX" is used for simplification of a description, denotes transmission and/or reception of data, and denotes a conditional branch where a process in a branching direction is executed with transmission and/or reception of the data being used as a condition.

The remote operation device 20 determines whether or not a designating operation through the remote input interface 210 by the operator is performed (STEP 210 in FIG. 4). A "designating operation" is an operation such as tapping on the remote input interface 210 for designating the work machine 40 that the operator intends to remotely operate, for example. In a case where the determination result is negative (NO in STEP 210 in FIG. 4), a series of processes is finished. On the other hand, in a case where the determination result is affirmative (YES in STEP 210 in FIG. 4), an environment check request is transmitted to the work assistance server 10 through the remote wireless communication apparatus 224 (STEP 212 in FIG. 4).

In a case where the work assistance server 10 receives the environment check request, the first assistance process element 121 transmits the environment check request to the concerned work machine 40 (C10 in FIG. 4).

In a case where the work machine 40 receives the environment check request through the actual machine wireless communication apparatus 422 (C40 in FIG. 4), the actual machine control device 400 acquires a captured image through the actual machine image-capturing device 412 (STEP 410 in FIG. 4). Based on communication between the work machine 40 and the unmanned aircraft 60 flying around the work machine 40, the actual machine control device 400 may acquire a captured image through the aircraft image-capturing device 612 mounted on the unmanned aircraft 60. The actual machine control device 400 transmits captured image data which represent the captured image to work assistance server 10 through the actual machine wireless communication apparatus 422 (STEP 412 in FIG. 4).

In the work assistance server 10, in a case where the first assistance process element 121 receives the captured image data (C11 in FIG. 4), the second assistance process element 122 transmits environment image data, which correspond to the captured image, to the remote operation device 20 (STEP 110 in FIG. 4). The environment image data are the captured image data themselves and are also image data which are generated based on the captured image and represent a simulated environment image.

In a case where the remote operation device 20 receives the environment image data through the remote wireless communication apparatus 224 (C21 in FIG. 4), the remote control device 200 outputs an environment image, which corresponds to the environment image data, to the remote image output device 221 (STEP 214 in FIG. 4).

Figure 6:
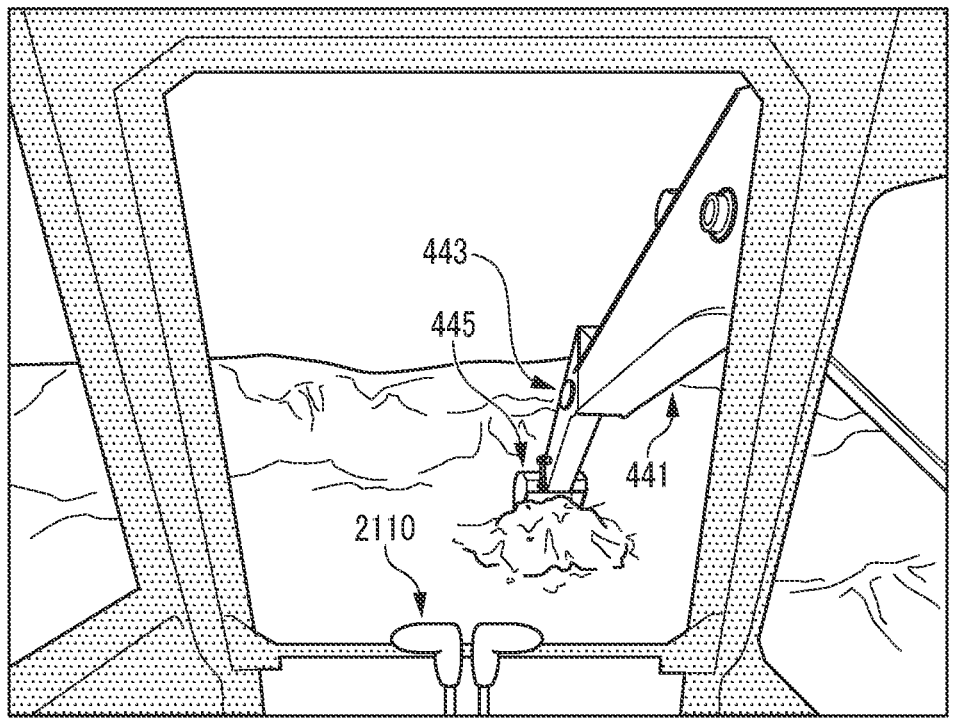
FIG. 6 is an explanatory diagram about a work environment image.

Accordingly, for example, as illustrated in FIG. 6, an environment image, in which the boom 441, the arm 443, and the bucket 445 as parts of the work mechanism 440 appear, is output to the remote image output device 221.

In the remote operation device 20, an operation manner of the remote operation mechanism 211 is recognized by the remote control device 200 (STEP 216 in FIG. 4), and a remote operation command corresponding to the operation manner is transmitted to the work assistance server 10 through the remote wireless communication apparatus 224 (STEP 218 in FIG. 4).

In the work assistance server 10, in a case where the second assistance process element 122 receives the remote operation command, the first assistance process element 121 transmits the remote operation command to the work machine 40 (C12 in FIG. 4).

In the work machine 40, in a case where the actual machine control device 400 receives an operation command through the actual machine wireless communication apparatus 422 (C41 in FIG. 4), actions of the work mechanism 440 and so forth are controlled (STEP 414 in FIG. 4). For example, work is executed in which earth in front of the work machine 40 is scooped by the bucket 445, the upper revolving body 420 is revolved, and earth is then dropped from the bucket 445.

(Second Function)

Figure 5:
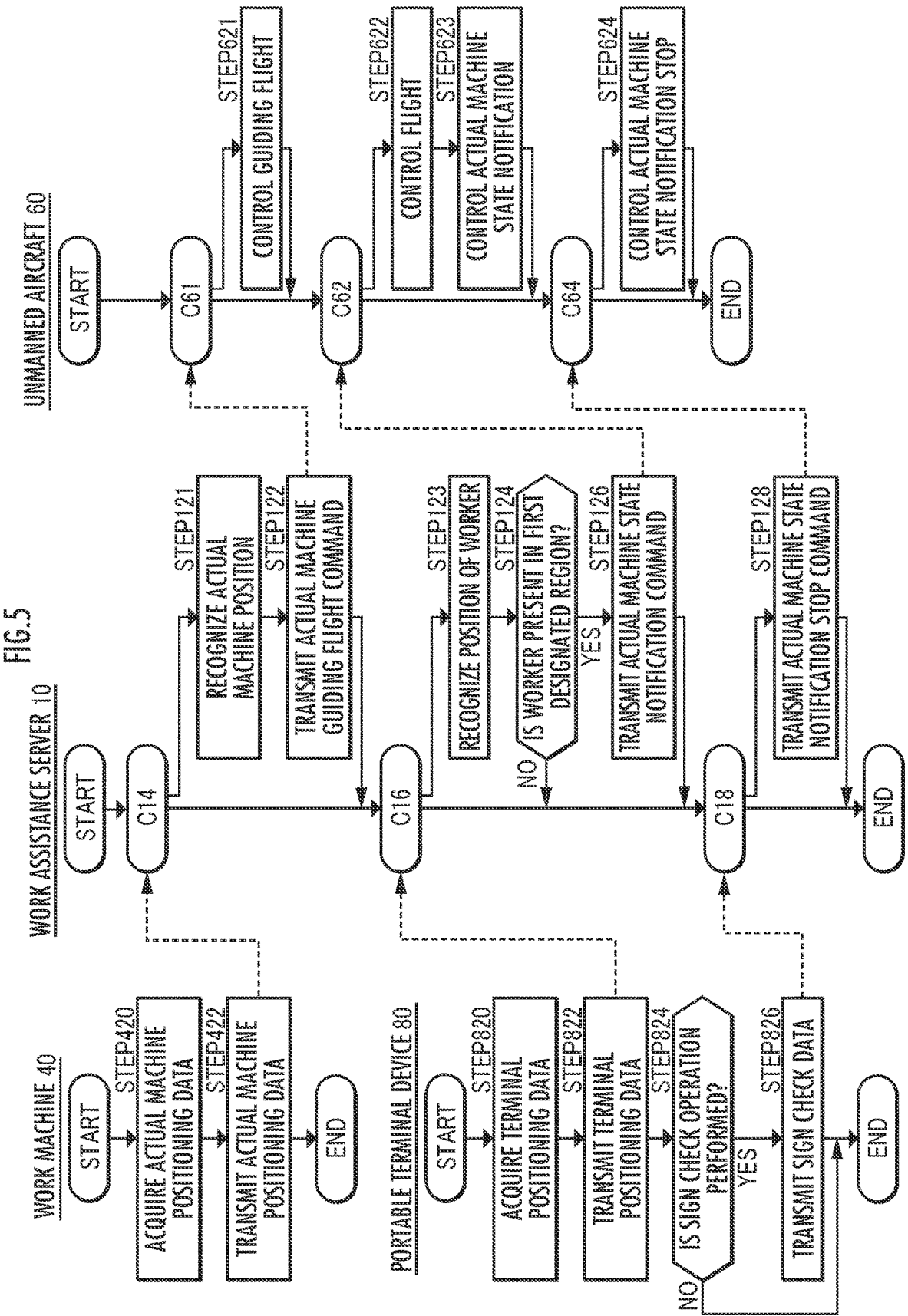
FIG. 5 is an explanatory diagram about a second function of the work assistance system.

FIG. 5 is a flowchart for explaining a second function as an actual machine state notification function of the work assistance system, the second function being exhibited by cooperation among the work assistance server 10, the remote operation device 20, the work machine 40, the unmanned aircraft 60, and the portable terminal device 80 in the above configurations. In the flowchart, a block indicated by "CXX" is used for simplification of a description, denotes transmission and/or reception of data, and denotes a conditional branch where a process in a branching direction is executed with transmission and/or reception of the data being used as a condition.

In the work machine 40, the actual machine control device 400 acquires actual machine positioning data, which represent the position (specified by the latitude and longitude) of the work machine 40 through a positioning sensor configuring the actual machine state sensor group 414 (STEP 420 in FIG. 5). The actual machine control device 400 transmits the actual machine positioning data to the work assistance server 10 through the actual machine wireless communication apparatus 422 (STEP 422 in FIG. 5).

In a case where the work assistance server 10 receives the actual machine positioning data (C14 in FIG. 5), the first assistance process element 121 recognizes an actual machine position as a position of the work machine 40 (STEP 121 in FIG. 5).

Next, the second assistance process element 122 generates an actual machine guiding flight command, which includes an aircraft target position track as a time series of the position of the unmanned aircraft 60, the aircraft target position track being for guiding the work machine 40 in accordance with an actual machine target position track registered in the database 102 (for causing the actual machine position to agree with the actual machine target position track), and transmits the actual machine guiding flight command to the concerned unmanned aircraft 60 (STEP 122 in FIG. 5). The actual machine target position track may be registered in the database 102 upon being set by the remote operation device 20 through the remote input interface 210. Instead of the actual machine target position track, an actual machine predicted position track may be used which represents a time series of a future position of the work machine 40, the future position being predicted from a past time series of the actual machine position.

In order to avoid interference between the work machine 40 and the unmanned aircraft 60, the actual machine guiding flight command may include measurement results of positions and postures of the boom 441, the arm 443, and the bucket 445 in their respective work machine coordinate systems (coordinate systems in which positions and postures are fixed with respect to the upper revolving body 420). The measurement results are calculated based on respective angles of a coupling mechanism (or joint mechanism) between the upper revolving body 420 and the boom 441, a coupling mechanism between the boom 441 and the arm 443, and a coupling mechanism between the arm 443 and the bucket 445 and further based on respective sizes of the boom 441, the arm 443, and the bucket 445.

Figure 7:
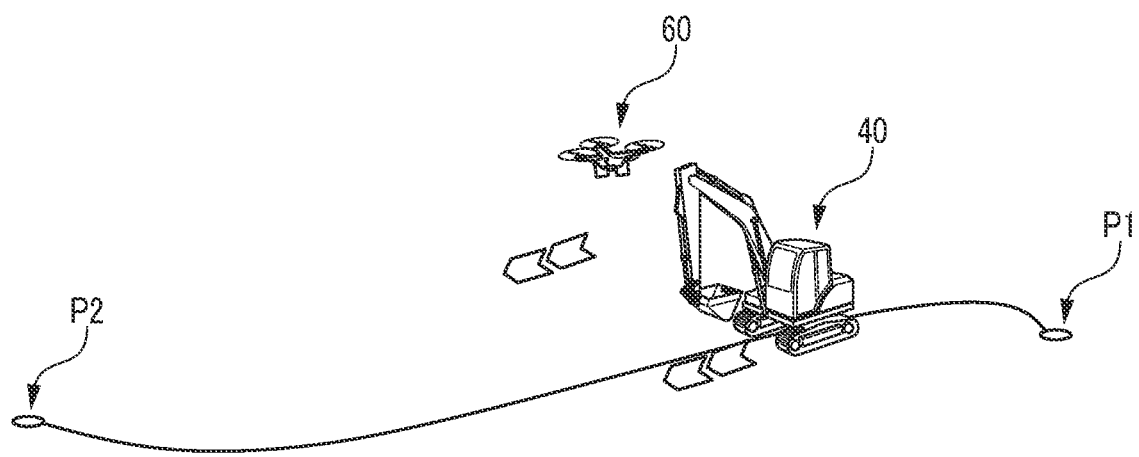
FIG. 7 is an explanatory diagram about a guiding function for the work machine by an unmanned aircraft.

In the unmanned aircraft 60, in a case where the aircraft control device 600 receives the actual machine guiding flight command through the aircraft wireless communication apparatus 622 (C61 in FIG. 5), a flight manner of the unmanned aircraft 60 is controlled in accordance with the aircraft target position track (or the actual machine target position track) included in the command (STEP 621 in FIG. 5). Specifically, the aircraft control device 600 controls respective rotation actions of the actuator (electric motor) and further the plural blades having the actuator as a motive power source in accordance with the flight command signal. Accordingly, the unmanned aircraft 60 can fly using airflow produced by rotating the plural blades, rise and fall at its present position, or stay in the air. Accordingly, as illustrated in FIG. 7, the unmanned aircraft 60 flies in front of the work machine 40 so as to guide or lead the work machine 40 from a first position P1 to a second position P2.

In the remote operation device 20, the operator operates the traveling lever or the like configuring the remote operation mechanism 211 by referring to an advancing direction of the unmanned aircraft 60 which appears in a work environment image (see FIG. 6), and the work machine 40 is thereby remotely controlled so as to follow the unmanned aircraft 60 (see STEP 216 to STEP 218 to . . . to STEP 414 in FIG. 4). An operator riding on the cab 424 operates a traveling lever or the like configuring the actual machine operation mechanism 411 by referring to the advancing direction of the unmanned aircraft 60 which is present in front of the cab 424, and the work machine 40 may thereby be controlled so as to follow the unmanned aircraft 60. Alternatively, in the work machine 40, the actual machine control device 400 may perform control such that the unmanned aircraft 60 is included in the work environment image or a designated image region as a part of the work environment image, that is, such that the work machine 40 follows the unmanned aircraft 60.

In the portable terminal device 80, the terminal control device 800 acquires terminal positioning data, which represent the position of the portable terminal device 80 (further the position of a worker carrying that) (specified by the latitude and longitude) through the positioning sensor configuring the terminal state sensor group 814 (STEP 820 in FIG. 5). The terminal control device 800 transmits the terminal positioning data to the work assistance server 10 through the terminal wireless communication apparatus 822 (STEP 822 in FIG. 5).

The position of the worker may be recognized based on a position in a captured image acquired through the actual machine image-capturing device 412 mounted on the work machine 40 and/or the aircraft image-capturing device 612 mounted on the unmanned aircraft 60 and based on the position of the work machine 40 and/or the unmanned aircraft 60. From this viewpoint, the portable terminal device 80 or a part of its functions may be omitted. In a case where the work assistance server 10 receives the terminal positioning data (C16 in FIG. 5), the first assistance process element 121 recognizes the position of the portable terminal device 80 (STEP 123 in FIG. 5).

Next, the second assistance process element 122 determines whether or not a worker, whose present position (or predicted future position) is included in a first designated region R1, is present (STEP 124 in FIG. 5). The first designated region R1 is a region which is defined with the position of the work machine 40 being set as a reference. For example, as respectively illustrated in FIG. 8A and FIG. 8B, a region, which includes the present position of the work machine 40 and is unevenly distributed in the advancing direction of the work machine 40 (see the broken-line arrows in FIG. 8A and FIG. 8B), may be defined as the first designated region R1. A region which is spaced away from the work machine 40 in its advancing direction or in front of that may be defined as the first designated region R1. A shape of the first designated region R1 on a horizontal plane or a ground surface may be a circular shape or, in addition to that, various shapes such as an elliptical shape, a triangular shape, a rectangular shape, a trapezoidal shape, and a regular polygon having N sides (N denotes an integer equivalent to or greater than five). A size of the first designated region R1 may be defined in accordance with a spatially occupying volume or a magnitude of expansion of the work machine 40 and/or a level of a moving speed of the work machine 40.

Figure 8A:
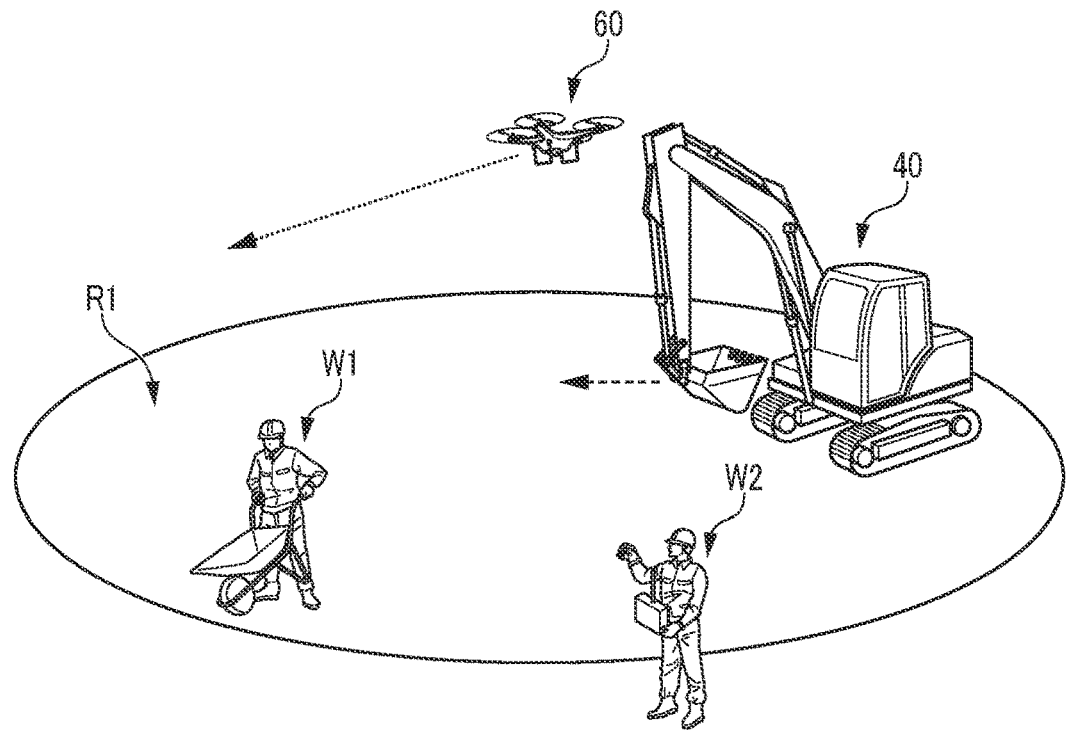
FIG. 8A is an explanatory diagram about a first specifying manner of a worker as a notified target of an actual machine state.

As illustrated in FIG. 8A, in a case where a first worker W1 is included in the first designated region R1, the determination result is affirmative about the first worker W1. On the other hand, as illustrated in FIG. 8A, in a case where a second worker W2 is outside the first designated region R1, the determination result is negative about the second worker W2.

Figure 8B:
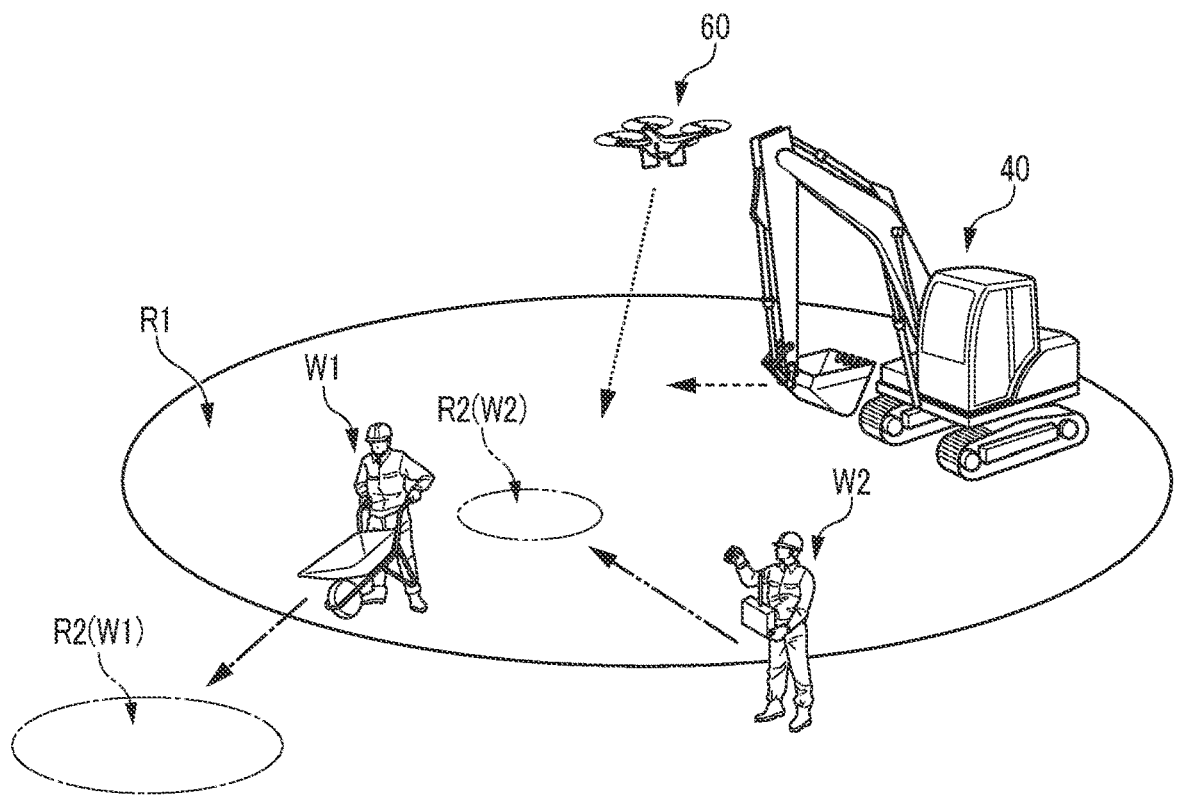
FIG. 8B is an explanatory diagram about a second specifying manner of a worker as a notified target of the actual machine state.

Instead of or in addition to the determination process (STEP 124 in FIG. 5), a determination may be made about whether or not a predicted position of the worker, which is predicted based on a time series of the position of the worker, or a second designated region R2, which expands with respect to the predicted position as a reference, overlaps the first designated region R1. For example, as illustrated in FIG. 8B, in a case where the second designated region R2(W1), which expands with respect to a predicted position track (see the one-dot-chain-line arrow) of the first worker W1 as the reference, does not overlap the first designated region R1, the determination result is negative about the first worker W1. On the other hand, as illustrated in FIG. 8B, in a case where the second designated region R2(W2), which expands with respect to a predicted position track (see the two-dot-chain-line arrow) of the second worker W2 as the reference, overlaps the first designated region R1, the determination result is affirmative about the second worker W2. A shape of the second designated region R2 on a horizontal plane or a ground surface may be a circular shape or, in addition to that, various shapes such as an elliptical shape, a triangular shape, a rectangular shape, a trapezoidal shape, and a regular polygon having N sides (N denotes an integer equivalent to or greater than five). A size of the second designated region R2 may be defined in accordance with a level of a moving speed of the worker. As the second designated region, for example, an assigned area defined for the worker based on a work plan is set.

In a case where the determination result is negative (NO in STEP 124 in FIG. 5), the actual machine guiding flight command corresponding to reception of the actual machine positioning data and a transmission process are repeated (C14 to STEP 121 to STEP 122 in FIG. 5).

On the other hand, in a case where the determination result is affirmative (YES in STEP 124 in FIG. 5), an actual machine state notification command including the position of the concerned worker is transmitted to the concerned unmanned aircraft 60 (STEP 126 in FIG. 5). In this case, the second assistance process element 122 may cause the remote output interface 220 to output information that the unmanned aircraft 60 is moved to a position facing the position of the worker in a downward direction.

In the unmanned aircraft 60, in a case where the aircraft control device 600 receives the actual machine state notification command through the aircraft wireless communication apparatus 622 (C62 in FIG. 5), the flight manner of the unmanned aircraft 60 is controlled such that the unmanned aircraft 60 flies toward the position of the worker which is included in the command (STEP 622 in FIG. 5). Accordingly, as illustrated in FIG. 8A, the unmanned aircraft 60 flies toward the concerned first worker W1 (see the broken-line arrow). Further, as illustrated in FIG. 8B, the unmanned aircraft 60 flies toward the concerned second worker W2 (see the broken-line arrow).

In addition, in a case where the unmanned aircraft 60 reaches the position facing the position of the worker in the downward direction, the aircraft control device 600 controls an action of the aircraft projection device 624, and the sign image is thereby projected onto a peripheral region of the worker (STEP 623 in FIG. 5). A "sign image" is an image which represents a moving manner of the work machine 40, the moving manner being specified by the moving speed (including a moving direction), acceleration, or deceleration of the work machine 40 and/or a distance from the worker or the like. Differences in the moving manner of the work machine 40 are identifiably represented by shapes, colors, or patterns of the sign image, or arbitrary combinations of those or by differences in a changing manner of those in a time series, for example. The peripheral region of the worker is a region which expands with respect to the worker as a reference and may be a region which is unevenly distributed on a bearing on which the work machine 40 is present when seen from the worker, for example.

Figure 9A:
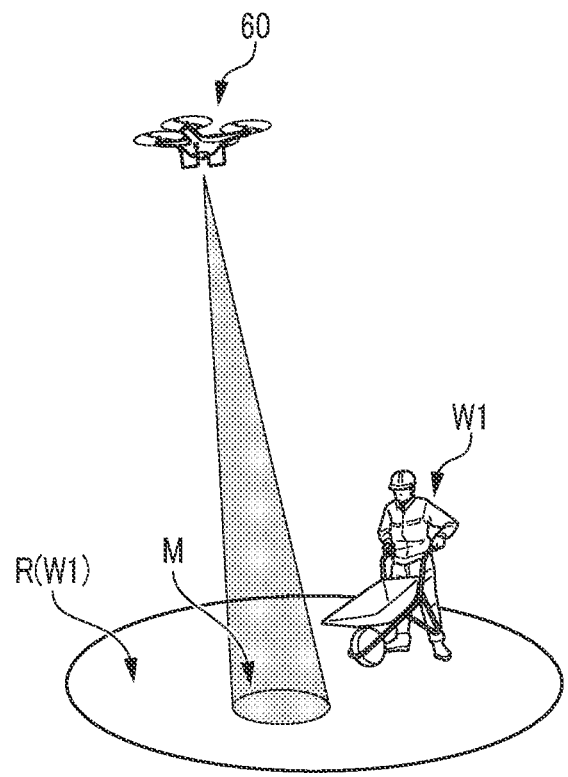
FIG. 9A is an explanatory diagram about a first notification manner of the actual machine state for the worker by the unmanned aircraft.
Figure 9B:
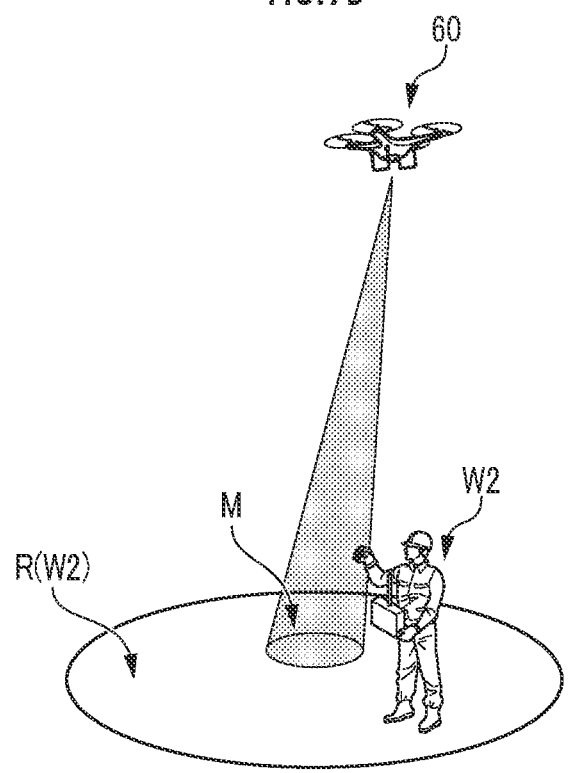
FIG. 9B is an explanatory diagram about a second notification manner of the actual machine state for the worker by the unmanned aircraft.

Accordingly, for example, in the situation illustrated in FIG. 8A, as illustrated in FIG. 9A, a sign image M is projected onto a peripheral region S(R1) of the first worker W1 by the unmanned aircraft 60. Further, in the situation illustrated in FIG. 8B, as illustrated in FIG. 9B, the sign image M is projected onto a peripheral region S(R2) of the second worker W2 by the unmanned aircraft 60.

In a case where the position of the worker is included in the first designated region R1, a projecting manner of the sign image M may be differentiated in accordance with whether or not the second designated region R2 corresponding to the predicted position track of the worker overlaps the first designated region R1.

The second assistance process element 122 causes the unmanned aircraft 60 to project the sign image M onto a place in the peripheral region of the worker, the place being unevenly distributed on a bearing, on which the position (the present position and/or the predicted future position) of the work machine 40, the position being recognized by the first assistance process element 121, or a time series of the position is present, with respect to the position of the worker as a reference. For example, in a case where the present position of the work machine 40 is present on a bearing of east as seen from the worker, the sign image M may be projected on the bearing of east of the peripheral region of the worker. In a case where the work machine 40 thereafter moves on a bearing of northeast as seen from the worker, the sign image M may be projected on the bearing of northeast of the peripheral region of the worker.

Figure 10A:
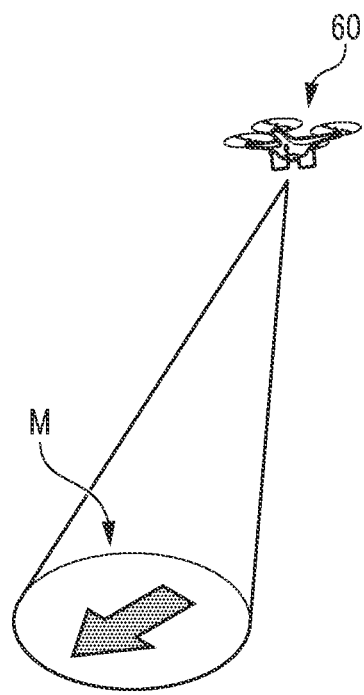
FIG. 10A is an explanatory diagram about a fourth notification manner of the actual machine state for the worker by the unmanned aircraft.
Figure 10B:
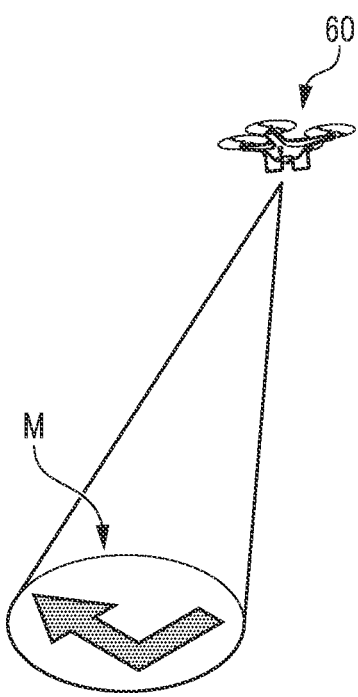
FIG. 10B is an explanatory diagram about a fifth notification manner of the actual machine state for the worker by the unmanned aircraft.

Based on the respective positions of the work machine 40 and the worker, the positions being recognized by the first assistance process element 121, the second assistance process element 122 causes the unmanned aircraft 60 to project the sign image M onto the peripheral region of the worker, the sign image M representing a bearing, on which the position (the present position and/or the predicted future position) of the work machine 40 or the time series of the position is present, with respect to the position of the worker as the reference. For example, in a case where the bearing on which the time series of the work machine 40 is present with respect to the present position of the work machine 40 is a linear bearing, as illustrated in FIG. 10A, the unmanned aircraft 60 may project the sign image M representing a linear shape onto the peripheral region of the worker. Further, in a case where the bearing on which the time series of the work machine 40 is present with respect to the present position of the work machine 40 is a curved bearing, that is, in a case where the work machine 40 turns in a right direction or a left direction, as illustrated in FIG. 10B, the unmanned aircraft 60 may project the sign image M representing a curved shape onto the peripheral region of the worker.

In a case where both of the first worker W1 and the second worker W2 are included in a first designated region R1 and the distance between both of the workers is short enough that the peripheral regions S(R1) and S(R2) overlap each other, as illustrated in FIG. 9C, the sign image M may be projected onto an overlapping region by the unmanned aircraft 60. In addition, in a case where both of the first worker W1 and the second worker W2 are included in the first designated region R1 and the distance between both of the workers is large enough that the peripheral regions S(R1) and S(R2) do not overlap each other, the sign image M may sequentially be projected onto each of the peripheral regions S(R1) and S(R2) by the unmanned aircraft 60. Control may be performed such that a projecting time period of the sign image M becomes longer as the number of workers as targets becomes greater. Projecting order of the sign image M in this case may be defined in accordance with the distances between the work machine 40 and each of the workers (such that the sign image M is earlier projected for the worker at the shorter distance, for example).

In the unmanned aircraft 60, in a case where the aircraft control device 600 receives the actual machine state notification command through the aircraft wireless communication apparatus 622 (C62 in FIG. 5), instead of or in addition to projection of the sign image M, a directional sound toward the position of the worker which is included in the command may be output from the aircraft sound output device 626.

In the portable terminal device 80 carried by the worker who becomes a projection target of the sign image M, the terminal control device 800 determines whether or not a sign check operation is performed through the terminal input interface 810 (STEP 824 in FIG. 5).

In a case where the determination result is negative (NO in STEP 824 in FIG. 5), a process of acquiring the terminal positioning data (STEP 820 in FIG. 5) and subsequent processes are repeated. On the other hand, in a case where the determination result is affirmative (YES in STEP 824 in FIG. 5), sign check data are transmitted to the work assistance server 10 (STEP 826 in FIG. 5).

In a case where the work assistance server 10 receives the sign check data (C18 in FIG. 5), the second assistance process element 122 transmits an actual machine state notification stop command to the concerned unmanned aircraft 60 (STEP 128 in FIG. 5).

In the unmanned aircraft 60, in a case where the aircraft control device 600 receives the actual machine state notification stop command through the aircraft wireless communication apparatus 622 (C64 in FIG. 5), projection of the sign image M is stopped, the projection being performed by the unmanned aircraft 60 onto the peripheral region of the worker which is included in the command (STEP 624 in FIG. 5). In a case where no actual machine state notification stop command is given, projection of the sign image M by the unmanned aircraft 60 is automatically stopped after a designated period elapses after projection of the sign image M by the unmanned aircraft 60 is started. Subsequently, control of the flight manner of the unmanned aircraft 60 is executed, the control corresponding to reception of the actual machine guiding flight command (C61 to STEP 621 in FIG. 5). As for the combinations of the work machine 40 and the worker that become projection targets of the sign images for a predetermined number of times (for example, once), projection of the sign image representing the moving manner of the work machine 40 onto the peripheral region of the worker may be skipped.

(Effects)

In the work assistance system in the above configuration, the sign image M is projected onto the peripheral region of the worker (for example, a ground surface which is present in the vicinity of the worker to the extent that the worker is capable of visually recognizing the sign image M) by the unmanned aircraft 60 (see FIG. 9A to FIG. 9C). The sign image M is an image which represents the moving manner of the work machine 40. Thus, regardless of the distance between the work machine 40 and the worker, reliability of a notification about the moving manner of the work machine 40 for the worker is achieved compared to a case where the sign image M is projected onto an irrelevant place to the position of the worker.

(Other Embodiments of the Present Invention)

In the above embodiment, the work assistance system is configured with the work assistance server 10; however, as another embodiment, at least a part of functions of the work assistance system may be exhibited by the remote operation device 20, the work machine 40, the unmanned aircraft 60, and/or the portable terminal device 80. For example, as for the second function (see FIG. 5), functions of the second assistance process element 122 may be exhibited by the unmanned aircraft 60.

In the above embodiment, one work machine 40 and one unmanned aircraft 60 cooperate with each other, but as another embodiment, one work machine 40 and plural unmanned aircraft 60 may cooperate with each other.

Figure 11A:
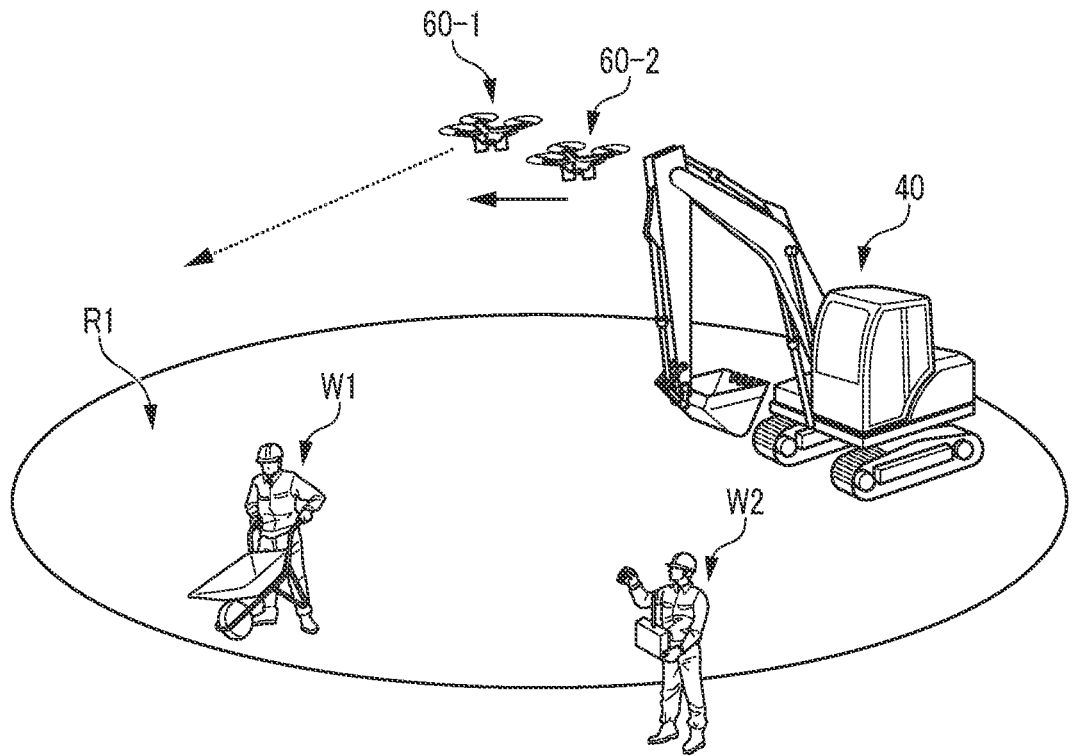
FIG. 11A is an explanatory diagram about a first cooperation manner of plural unmanned aircraft.
Figure 11B:
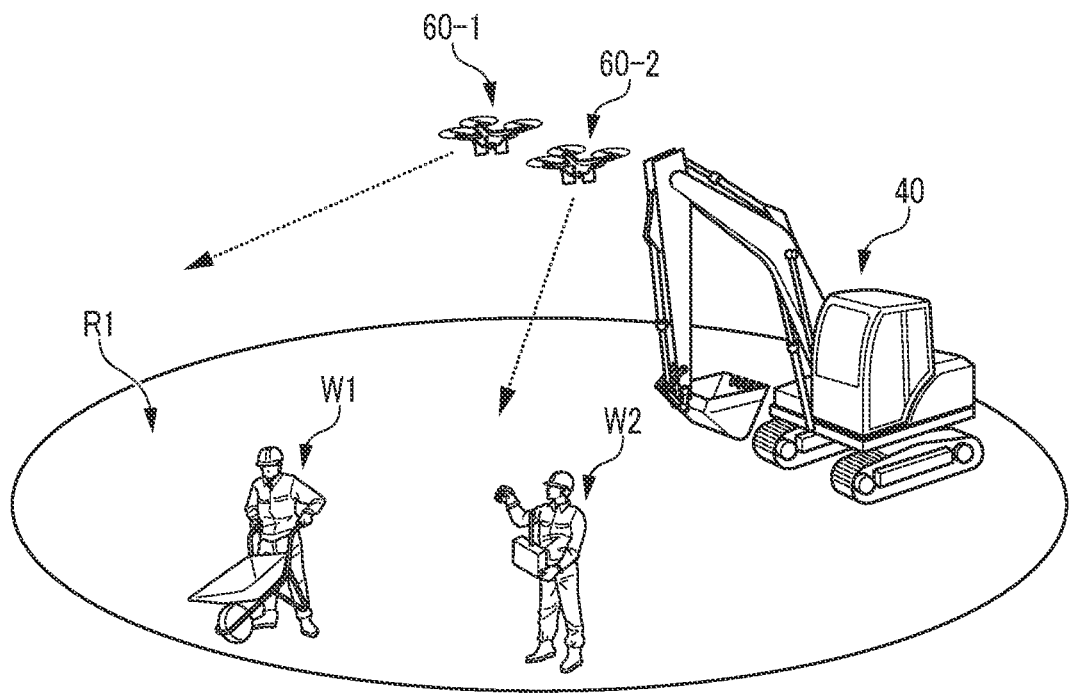
FIG. 11B is an explanatory diagram about a second cooperation manner of the plural unmanned aircraft.

For example, as illustrated in FIG. 11A, in a case where one worker whose present position is included in the first designated region R1 is present among plural workers W1 and W2, a projection process of the sign image M may be allocated to one unmanned aircraft 60-1 (see STEP 622 to STEP 623 in FIG. 5), and a guiding flight for the work machine 40 may be allocated to another unmanned aircraft 60-2 (see STEP 621 in FIG. 5). Further, as illustrated in FIG. 11B, in a case where two workers whose present positions are included in the first designated region R1 are present among the plural workers W1 and W2, the projection process of the sign image M may be allocated to each of the one unmanned aircraft 60-1 and the other unmanned aircraft 60-2 (see STEP 622 to STEP 623 in FIG. 5).

The second assistance process element 122 causes the work machine 40, whose moving manner is represented by the sign image M projected onto the peripheral region of the worker by the unmanned aircraft 60, to output a sign notification in a form in which the sign notification is visually recognizable for the worker. In this case, the second assistance process element 122 may perform control such that the projecting manner of the sign image M by the unmanned aircraft 60 corresponds to an outputting manner of the sign notification by the work machine 40. Specifically, control may be performed such that a color and/or a flashing manner of the sign notification (characters of light or an LED panel) by a light emitting device configuring the actual machine output interface 42 of the work machine 40 agree with a color and/or a flashing manner of the sign image M to be projected by the unmanned aircraft 60 or such that a certain correlation is reproduced between those.

In the work assistance system in the above configuration, the visually recognizable sign notification output by the work machine 40 can enable the worker to recognize the work machine 40 whose moving manner is represented by the sign image M projected onto the peripheral region of the worker by the unmanned aircraft 60. Thus, even in a case where plural work machines 40 are present at the work site, the moving manner of which work machine 40 among the plural work machines 40 has to be focused on can clearly be perceived by the worker.

In the above embodiment, projection of the sign image M by the unmanned aircraft 60 is stopped in response to performance of the sign check operation in the portable terminal device 80 (see YES in STEP 824 to STEP 826 to . . . to STEP 624 in FIG. 5); however, as another embodiment, projection of the sign image M by the unmanned aircraft 60 may automatically be stopped after a designated period elapses after projection of the sign image M by the unmanned aircraft 60 is started. From this viewpoint, the portable terminal device 80 or a part of its functions may be omitted.

In the above embodiment, in a case where the worker whose present position (or predicted future position) is included in the first designated region R1 is not present (NO in STEP 124 in FIG. 5), the second assistance process element 122 does not perform projection of the sign image M by the unmanned aircraft 60; however, as another embodiment, as for the unmanned aircraft 60, while the flight manner of the unmanned aircraft 60 is controlled by the aircraft control device 600 in accordance with the aircraft target position track (or the actual machine target position track) included in the actual machine guiding flight command which is received through the aircraft wireless communication apparatus 622 (STEP 621 in FIG. 5), projection of the sign image M by the unmanned aircraft 60 may be performed.

Further, in a case where the moving manner of the work machine 40 which is recognized by the first assistance process element indicates that the work machine 40 does not move, as illustrated in FIG. 12, the unmanned aircraft 60 may project the sign image M representing stop of the work machine 40 as the moving manner of the work machine 40.

In the work assistance system of the present invention,
the first assistance process element may recognize a first designated region which is defined based on the time series of the position of the work machine, the position being recognized by the first assistance process element, and
the second assistance process element may cause the unmanned aircraft to project the sign image onto the peripheral region of the worker with a fact that the position of the worker which is recognized by the first assistance process element is included in the first designated region being set as a requirement.

In the work assistance system in the above configuration, with the fact that the position of the worker is included in the first designated region defined based on the time series of the position of the work machine being set as the requirement, the worker can be enabled to recognize the moving manner of the work machine by the sign image projected onto the peripheral region of the worker.

In the work assistance system of the present invention,
the first assistance process element may recognize a second designated region which is defined based on the time series of the position of the worker, the position being recognized by the first assistance process element, and
the second assistance process element may cause the unmanned aircraft to project the sign image onto a ground surface of the first designated region in a different manner in accordance with whether or not at least a part of the first designated region or of the time series of the position of the work machine is included in the second designated region recognized by the first assistance process element.

In the work assistance system in the above configuration, the unmanned aircraft projects the sign image onto the peripheral region of the worker in a different manner in accordance with whether or not a part of the time series of the position of the work machine or of the first designated region defined based on the time series is included in the second designated region defined in accordance with time series of the position of the worker. Based on the difference between projecting manners of the sign image, the worker can be enabled to recognize whether or not a part of the first designated region is included in the second designated region (for example, whether or not the work machine moving toward the worker passes through the second designated region can be known).

In the work assistance system of the present invention,
the second assistance process element may cause the unmanned aircraft to project the sign image onto a place in the peripheral region of the worker, the place being unevenly distributed on a bearing, on which the position of the work machine, the position being recognized by the first assistance process element, or the time series of the position is present, with respect to the position of the worker as a reference.

The work assistance system in the above configuration can enable the worker to recognize that the work machine is present on the bearing, on which the sign image is projected, with respect to the position of the worker as the reference.

In the work assistance system of the present invention,
based on the respective positions of the work machine and the worker, the positions being recognized by the first assistance process element, the second assistance process element may cause the unmanned aircraft to project the sign image onto the peripheral region of the worker, the sign image representing a bearing, on which the position of the work machine or the time series of the position is present, with respect to the position of the worker as a reference.

The work assistance system in the above configuration can enable the worker to recognize the bearing, on which the position of the work machine or the time series of the position is present, with respect to the position of the worker as the reference, the bearing being represented as the moving manner of the work machine, by the sign image (specifically, its design and/or projecting manner) projected onto the peripheral region of the worker by the unmanned aircraft.

In the work assistance system of the present invention,
the second assistance process element may cause the work machine, a moving manner of which is represented by the sign image projected onto the peripheral region of the worker by the unmanned aircraft, to output a notification in a form in which the notification is visually recognizable for the worker.

In the work assistance system in the above configuration, the visually recognizable notification output by the work machine can enable the worker to recognize the work machine, the moving manner of which is represented by the sign image projected onto the peripheral region of the worker by the unmanned aircraft. Accordingly, when plural work machines are present at a work site, the moving manner of which work machine among the plural work machines has to be focused on can clearly be identified by the worker.

In the work assistance system of the present invention,
the second assistance process element may cause a projecting manner of the sign image onto the peripheral region of the worker by the unmanned aircraft to correspond to an outputting manner of the sign notification by the work machine, the moving manner of which is represented by the sign image.

In the work assistance system in the above configuration, the visually recognizable sign notification output by the work machine can enable the worker to recognize the work machine, the moving manner of which is represented by the sign image projected onto the peripheral region of the worker by the unmanned aircraft. Thus, even in a case where plural work machines are present at the work site, the moving manner of which work machine among the plural work machines has to be focused on can clearly be perceived by the worker.

In the work assistance system of the present invention,
in a case where the unmanned aircraft is moved to the position facing the position of the worker in the downward direction, the position of the worker being recognized by the first assistance process element, the second assistance process element may cause an output interface, to which an operator of the work machine is adjacent, to output information indicating that the unmanned aircraft is moved to the position facing the position of the worker in the downward direction.

The work assistance system in the above configuration can reduce or eliminate discomfort of the operator due to a change in a flight manner of the unmanned aircraft.

A work assistance composite system of the present invention includes:

the work assistance system; and the unmanned aircraft.

REFERENCE SIGNS LIST 10 work assistance server
20 remote operation device
40 work machine
41 actual machine input interface
42 actual machine output interface
60 unmanned aircraft
80 portable terminal device
102 database
121 first assistance process element
122 second assistance process element
200 remote control device
210 remote input interface
211 remote operation mechanism
220 remote output interface
221 remote image output device
222 remote sound output device
224 remote wireless communication apparatus
410 lower traveling body
412 actual machine image-capturing device
414 actual machine state sensor group
420 upper revolving body
421 actual machine image output device (information output device)
422 actual machine wireless communication apparatus
440 work mechanism (work attachment)
445 bucket (work unit)
610 aircraft input interface
620 aircraft output interface
622 aircraft wireless communication apparatus
800 terminal control device
810 terminal input interface
820 terminal output interface

The invention claimed is:

1. A work assistance system comprising:
a first assistance process element which recognizes respective positions of a worker and a work machine in a time series manner and which recognizes a first designated region which is defined based on the time series of the position of the work machine; and
a second assistance process element which moves an unmanned aircraft to a position facing the position of the worker in a downward direction, the position of the worker being recognized by the first assistance process element, by controlling a flight action function of the unmanned aircraft, and which causes the unmanned aircraft to project a sign image representing a moving manner of the work machine onto a peripheral region of the worker, the moving manner being defined based on a time series of the position of the work machine, the position of the work machine being recognized by the first assistance process element, by controlling a sign projection function of the unmanned aircraft based on a requirement that the position of the worker recognized by the first assistance process element is included in the first designated region, wherein a size of the first designated region is defined in accordance with a spatially occupying volume or a magnitude of expansion of the work machine and/or a level of a moving speed of the work machine.

2. The work assistance system according to claim 1, wherein
the position of the work machine is recognized by the first assistance process element, and
the second assistance process element causes the unmanned aircraft to project the sign image onto the peripheral region of the worker with a fact that the position of the worker which is recognized by the first assistance process element is included in the first designated region being set as a requirement.

3. The work assistance system according to claim 2, wherein
the first assistance process element recognizes a second designated region which is defined based on the time series of the position of the worker, the position being recognized by the first assistance process element, and
the second assistance process element causes the unmanned aircraft to project the sign image onto a ground surface of the first designated region in a different manner in accordance with whether or not at least a part of the first designated region or of the time series of the position of the work machine is included in the second designated region recognized by the first assistance process element.

4. The work assistance system according to claim 1, wherein
the second assistance process element causes the unmanned aircraft to project the sign image onto a place in the peripheral region of the worker, the place being unevenly distributed on a bearing, on which the position of the work machine, the position being recognized by the first assistance process element, or the time series of the position is present, with respect to the position of the worker as a reference.

5. The work assistance system according to claim 1, wherein
based on the respective positions of the work machine and the worker, the positions being recognized by the first assistance process element, the second assistance process element causes the unmanned aircraft to project the sign image onto the peripheral region of the worker, the sign image representing a bearing, on which the position of the work machine or the time series of the position is present, with respect to the position of the worker as a reference.

6. The work assistance system according to claim 1, wherein
the second assistance process element causes the work machine, a moving manner of which is represented by the sign image projected onto the peripheral region of the worker by the unmanned aircraft, to output a sign notification in a form in which the sign notification is visually recognizable for the worker.

7. The work assistance system according to claim 6, wherein
the second assistance process element causes a projecting manner of the sign image onto the peripheral region of the worker by the unmanned aircraft to correspond to an outputting manner of the sign notification by the work machine, the moving manner of which is represented by the sign image.

8. The work assistance system according to claim 1, wherein in a case where the unmanned aircraft is moved to the position facing the position of the worker in the downward direction, the position of the worker being recognized by the first assistance process element, the second assistance process element causes an output interface, to which an operator of the work machine is adjacent, to output information indicating that the unmanned aircraft is moved to the position facing the position of the worker in the downward direction.

9. A work assistance composite system comprising:
the work assistance system according to claim 1; and the unmanned aircraft.

\* \* \* \* \*